July 3, 1923.
P. A. P. V. MAUCLÈRE
1,460,389
LIQUID DISPENSING STATION
Filed July 5, 1921    3 Sheets-Sheet 3
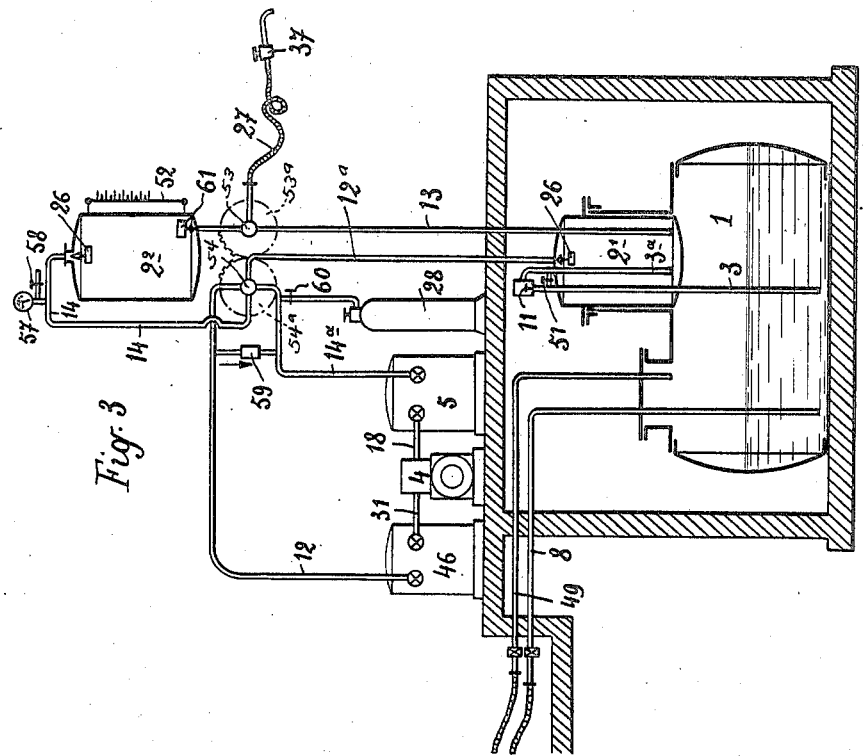
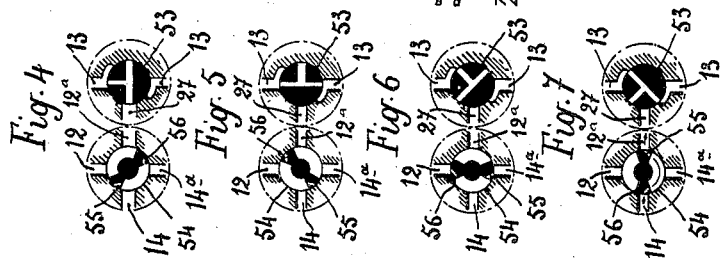
Inventor.
Pierre A. P. V. Mauclère
By
   Atty.

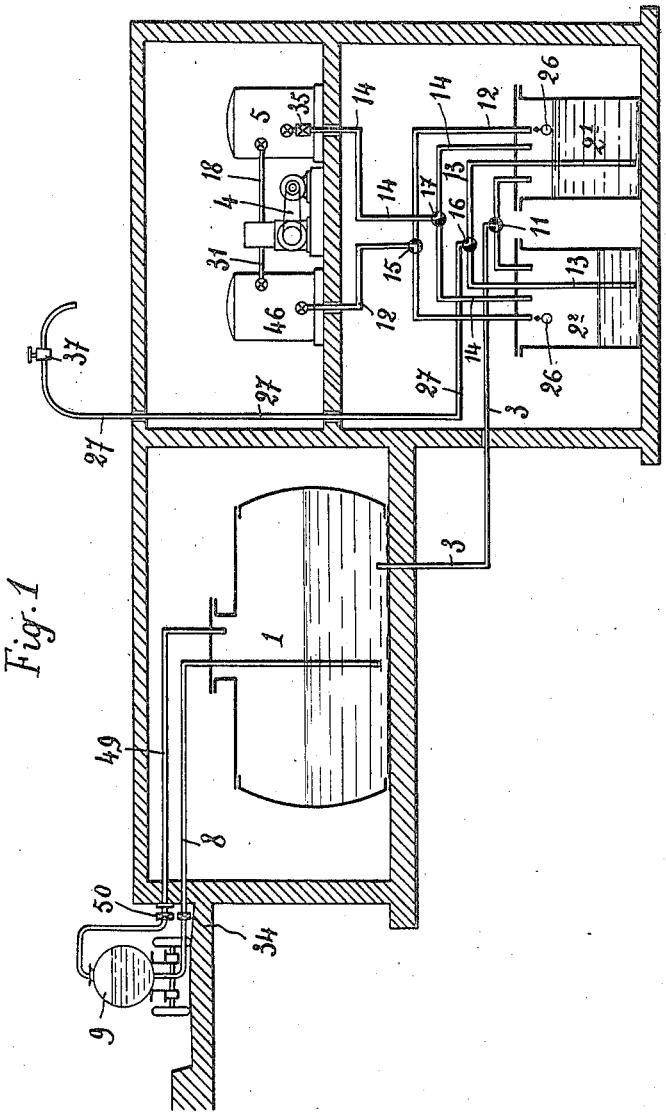

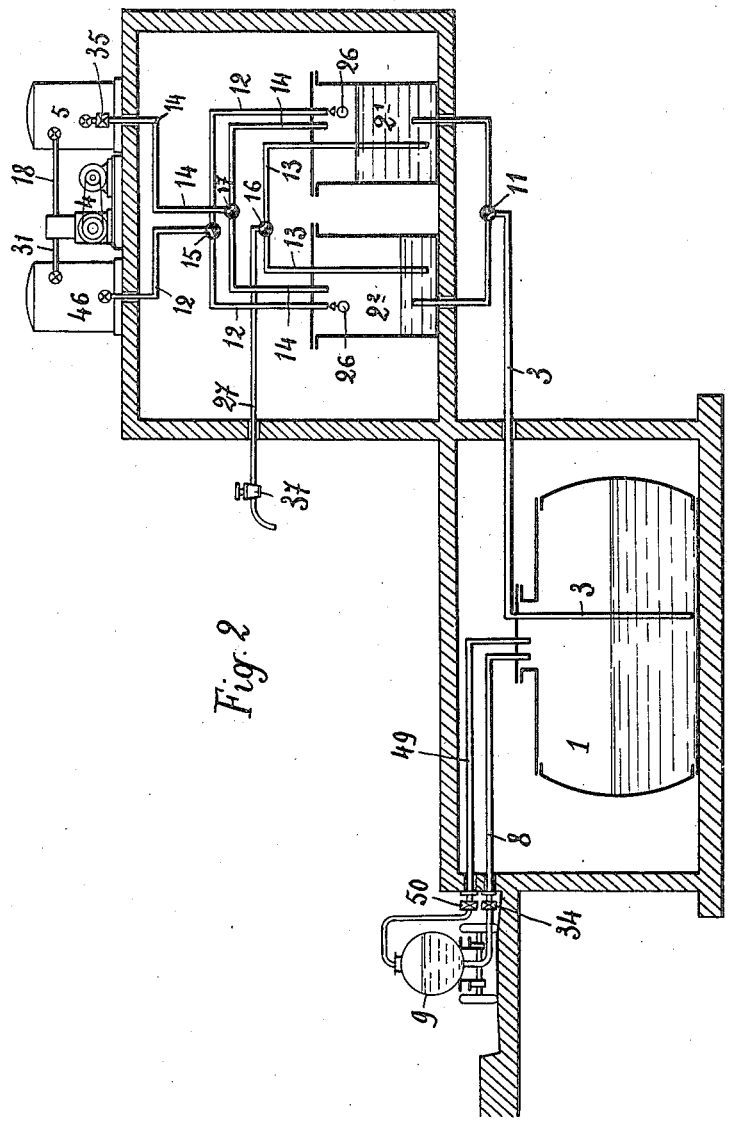

Patented July 3, 1923.

1,460,389

UNITED STATES PATENT OFFICE.

PIERRE ANDRÉ PAUL VICTOR MAUCLÈRE, OF PARIS, FRANCE.

LIQUID-DISPENSING STATION.

Application filed July 5, 1921. Serial No. 482,415.

*To all whom it may concern:*

Be it known that I, PIERRE ANDRÉ PAUL VICTOR MAUCLÈRE, citizen of the Republic of France, residing in Paris, France, and whose post-office address is 14 Rue de Cournon, have invented certain new and useful Improvements in Liquid-Dispensing Stations; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the United States patent application filed on February 19, 1920, a description was given of a liquid dispensing station or safety apparatus for storage and delivery of liquids, which is essentially characterized by the use of combined receptacles for obtaining either the storage or the delivery and the distribution of liquids.

The present invention relates to an apparatus which is also based upon the use of combined receptacles which are in this case independent of the storage tank or tanks and are disposed in a suitable manner for obtaining the pneumatic storage or delivery of liquids.

The said receptacles are combined with a set of two gas tanks disposed on either side of a compressor actuated by mechanical or like means, in such manner as to effect the movement of the liquid by a constant mass of gas employed in a closed cycle and at low pressure. The said receptacles, whereof one is filled while the other is emptied, may be disposed at a lower level than the other storage tanks, and in this case they become filled by gravity or they may be disposed above the said storage tanks, in which case the receptacles are filled by suction effect. For a simplified installation, the receptacles may be operated in a non-symmetrical manner, one of them constituting an auxiliary receptacle for effecting the filling of the other or main receptacle, while this latter is used for the direct delivery of the liquid for consumption. The two receptacles thus act by successive periods of suction and compression whereby the filling and the evacuation of the same are effected. In this arrangement the main receptacle is preferably disposed at a higher level than the auxiliary receptacle and it serves at the same time to measure the liquid, whereas the auxiliary receptacle may be disposed directly within the dome of the storage tank.

The accompanying drawings show three forms of construction of the apparatus according to this invention.

Fig. 1 is diagrammatic view of the whole apparatus in the first embodiment, wherein the receptacles are disposed at a lower level than the storage tank. Fig. 2 is a similar view of a second embodiment wherein the receptacles are disposed at a higher level than the storage tank.

Fig. 3 is a similar view of the third embodiment wherein the operation of the receptacles is of a nonsymmetrical character.

Figs. 4 to 7 show four different positions occupied by the control cocks of the installation Fig. 3, respectively during the periods of supply, filling, preparation and rest.

Referring to the embodiment shown in Fig. 1, it is observed that the installation essentially comprises a storage tank 1, two combined receptacles $2^1$ and $2^2$, a compressor 4, an expansion tank 46 disposed in the rear of the compressor, and a low pressure reservoir 5 arranged forwardly of the compressor.

The liquid to be manipulated is supplied to the storage tank 1 by the supply cask 9, flowing therefrom through the piping 8 provided with a cock 34. The piping 49, controlled by the cock 50 effects communication between the upper atmosphere of the tank 1 and the cask 9.

The filling of the receptacles $2^1$ and $2^2$ by the liquid of the reservoir is effected by the piping 3 controlled by a three-way cock 11. The receptacles are connected on one side with the expansion tank 46 by the piping 12 controlled by a three-way cock 15 and on the other side with the low pressure tank 5 by the piping 14 provided with a three-way cock 17. The expansion device 35 adjusted for the delivery pressure is disposed upon the pipe 14, on the discharge side of the tank 5. The delivery of the liquid from one or the other of the gauging devices is effected by the piping 13 provided with a three-way cock 16 and extended by the delivery piping 27 controlled by the discharge cock 37.

The compressor 4 is connected with the tank 46 by the piping 31 and with the tank 5 by the piping 18.

The operation of the installation is as follows:

*Storage.*—All that is required is to open the cocks 34 and 50 in order to provide for the direct filling of the tank 1 by the liquid of the cask 9 through the piping 8. By opening the cock 50, the upper atmosphere of the tank 1 will be displaced by the liquid, and the air will pass directly through the piping 49 into the cask 9, in such manner as to maintain a constant atmospheric pressure in these two receptacles and in their connecting pipes, without admission of air or discharge of gas.

*Withdrawal of liquid.*—Opening the cock 11 will permit of filling one or the other of the two receptacles by the liquid from the tank 1 which descends by gravity through the piping 3. With the cocks 11, 16, 17, 15 in the positions indicated, the receptacle $2^2$ is in the course of filling and the receptacle $2^1$ is in the course of emptying. The gas under pressure in the tank 5 will pass through the pipe 14 into the gauging device $2^1$ and will force the liquid through the pipe 13 and the pipe 27. The gas contained in the receptacle $2^2$ will pass through the piping 12 into the tank 46 whence it is withdrawn by the compressor 4 which delivers this gas into the tank 5 through the piping 18.

When the receptacle $2^1$ has been emptied and the receptacle $2^2$ is filled, all that is required is to invert the position of the cocks 11, 16, 17, 15 in order to effect the automatic inversion of the operation of the receptacles, and the receptacle $2^1$ is now filled while the receptacle $2^2$ is emptied. Under these conditions, the gases used to protect the liquid in the receptacles is employed in a closed cycle and may thus be used indefinitely.

In the arrangement shown in Fig. 2, the same parts are shown as have been already indicated in the preceding disposition, and the latter are provided with the same reference characters. The difference lies in the fact that the receptacles $2^1$ and $2^2$ are disposed at a higher level than the storage tank 1, and that the liquid enters the receptacles by suction effect, the compressor producing the required vacuum in the tank 46 to cause this suction. In all other respects, the operation is the same as in the preceding case.

The simplified installation shown in Fig. 3, comprises, as in the arrangement Figs. 1 and 2, a storage tank 1, two receptacles $2^1$, $2^2$, a compressor 4, and preferably disposed on either side of the latter a low pressure tank 5 and a relatively high pressure tank 46; these two tanks may however be omitted should it be desired to further simplify the installation.

One of the receptacles $2^1$ constitutes in this case the auxiliary receptacle, while the receptacle $2^2$ constitutes the main receptacle. The receptacle $2^1$ is disposed in the dome of the tank 1 itself. A pipe 3 immersed in the liquid of the tank 1 passes through the receptacle $2^1$ and ends in a check valve 11 which closes downwardly. A pipe $3^a$ starts from the check valve 11, passes through the upper part of the receptacle $2^1$ and ends at the bottom thereof. The pipe 3 and the pipe $3^a$ are connected below the check valve 11 by a pipe provided with a valve 51. A pipe 13 starts from the bottom of the auxiliary receptacle $2^1$ and ends at the bottom of the second or main receptacle $2^2$, whose capacity is somewhat smaller than that of the receptacle $2^1$ and which is provided with a glass tube 52 for observing the level of the liquid in the receptacle $2^2$. Upon the pipe 13 is mounted a three-way cock 53 whose third outlet is connected with the discharge piping 27 constituted by a flexible hose ending in a withdrawal tube provided with a control cock 37.

At the bottom of the receptacle $2^2$ is disposed a float valve 61 which closes the pipe 13 when the receptacle is emptied.

At the top of the receptacles $2^1$, $2^2$ are disposed the float valves 26, and from the seats of the said valves start the respective pipes $12^a$ and 14 ending in two different apertures of a four-way cock 54. The other two apertures of the said cock are connected through the tanks 5 and 46 by the pipes 12, $14^a$ respectively with the admission and the discharge ends of the compressor 4, which may be operated by hand or by mechanical means. The two gas tanks 5 and 46 may be inserted in the said piping, as here indicated. The two cocks 53 and 54 are connected together by gear wheels $54^a$ and $53^a$ in such manner that a single control device may be used to operate both cocks at the same time, enabling them to occupy the positions shown in Figs. 4 to 7. It will be observed in these latter figures that the barrel of the cock 54 is provided with two bleed ducts of small diameter 55, 56.

Upon the piping 14 may be advantageously mounted a vacuum and pressure controlling device 57 and a nozzle with checking cock 58. The piping 12 and $14^a$ may be connected through a suitably calibrated valve 59 opening from 12 to $14^a$. In the piping $14^a$ is disposed a neck with a cock 60, for connecting with a cylinder of compressed gas 28.

The operation of the installation is as follows:

*Preparation of the installation before starting.*—With the gas cylinder 28 connected and the cock 60 closed, the valve 51 being closed, the cocks 53, 54 are placed in the position shown in Fig. 4 and the compressor 4 is started, this latter effecting a suction from the receptacle 2¹ and discharging into the receptacle 2². During this operation the cock 37 is left open in order that all the air drawn from the receptacle 2¹ shall be discharged to the outside through the said cock 37. The liquid in the storage tank 1 rises through the pipe 3, passes through the valve 11 and fills the receptacle 2¹, rising to the level of the float 26 which it thereupon raises, closing the pipe 12ª. When it is judged that the result has been obtained, the cock 60 is opened through which the cylinder 28 will supply inert gas into the piping 14ª. The compressor 4 becomes filled with inert gas, as well as the receptacle 2². The proportion of oxygen in the expelled gas may be checked at the outlet of the cock 37. When this proportion is considered to be sufficiently small, the compressor is stopped, the cock 60 closed and the cocks 53, 54 are placed in the position shown in Fig. 7. The valve 51 is then opened, the cock 37 closed, and the cock 60 again opened. The pressure rises in the entire apparatus, and the liquid in the receptacle 2¹ is forced out into the storage tank 1, the whole apparatus being filled with inert gas at a pressure slightly above atmospheric pressure, as shown by the pressure gauge 57. The cock 60 is then closed and the inert gas is allowed to escape through the cock 58 until the said pressure gauge indicates atmospheric pressure. In this manner the installation is now in working order under atmospheric pressure and in the inoperative position, in such manner that there shall be no liquid above the level in the storage tank, save for a slight amount at the bottom of the receptacle 2¹.

*Preparatory position.*—To prepare the installation for delivery, the cocks 53, 54 are disposed as shown in Fig. 5, the valve 51 is closed, and the compressor 4 started. The compressor effects suction from the receptacle 2¹ and delivers into the receptacle 2²; the cock 37 is closed. The liquid rises in the pipe 3, passes through the check-valve 11 and fills the receptacle 2¹ to the level of the float 26 which it raises and thereby closes the piping 12. During the rise of the liquid in the receptacle 2¹ the pressure has risen in the receptacle 2², for instance to two atmospheres. As soon as the pipe 12ª is stopped by its needle valve, the compressor 4 produces a vacuum in the packing 12 and 14ª as far as the vacuum limit which characterises the same, and after this limit has been reached, the compressor will run idly and without consuming any power, the pressure ceases to rise in the receptacle 2² and the pointer of the pressure gauge 57 will remain stationary. When this result is attained, the cooks 53, 54 are placed in the position shown in Fig. 4 such that the compressor will effect suction from the receptacle 2² and will force the liquid into the receptacle 2¹, the liquid being enabled to flow directly through the piping 13. The check valve 11 closes and the liquid rises through the pipe 13 into the receptacle 2², wherein the rise may be followed by means of the glass tube 52. The liquid fills the receptacle 2² as far as the float 26 which it raises and thereby closes the piping 14. During this rise of the liquid in the receptacle 2₂ the pressure will rise in the receptacle 2¹ and will reach for instance two atmospheres. From the instant when pipe 14 is closed by the float, the compressor produces a vacuum in the piping 14, 14ª up to the vacuum limit of the compressor, and the pointer of the vacuum guage will stop at the graduation which indicates this vacuum. If no delivery is expected to occur before a certain time, the cocks 53, 54 are placed in the position shown in Fig. 6, thus closing the cock 53 in all directions and placing the compressor in short circuit through the small ducts in the barrel of the cock 54. The compressor is also stopped.

*Supply position.*—Two cases are here to be considered, according as it is required to supply a determined quantity of liquid, or an indetermined quantity, for instance in the case of filling a tank.

A. *First case—Supply of a previously determined quantity, for instance 17 litres.*— The user starts the compressor, places the cocks 53, 54 in the position shown in Fig. 4 thereby connecting pipes 12 and 12ª and 14 and 14ª and inserts the supply tube into the container which is to receive the liquid, holding the handle of the cocks 53, 54. The cock 37 is then opened; the liquid flows out, and the delivery is observed by means of the glass tube 52 which is graduated in litres and half litres starting from the top. When the level reaches the point 17, the user places the cocks 53, 54 in the position shown in Fig. 6. During this delivery operation the receptacle 2¹ is filled with liquid to a certain level which should be such that the quantity of liquid delivered into the receptacle 2¹ shall be exactly equal to what has been withdrawn from the reservoir 2². This equality will only be attained when the instantaneous delivery of the compressor is exactly equal to the instantaneous delivery of the cock 37. With the smaller types of compressors in current use, this result is not absolutely certain, and in order to obviate this drawback there is disposed at 59 a calibrated valve which operates as follows: If the delivery of the compressor is for instance five times the stipulated output at the supply tube, the receptacle 2¹ will be filled five times as rapidly as the receptacle $2^2$ is discharged, and thus the pressure above the liquid in the receptacle $2^2$ would become five times the acceptable value for the delivery at the supply tube. The cock 59, which is adjusted for exactly the pressure admissible above the liquid under discharge, will open when this pressure is attained, thus producing a short circuit between the pipes 12 and $14^a$ whereby the delivery is made regular as well as the filling of the receptacle $2^1$.

B. *Second case—Quantity is not previously determined.*—The apparatus being disposed in the preparatory position, the user starts the compressor, places the cocks 53, 54 in the position shown in Fig. 4 and inserts the supply tube into the container to be filled. The cock 37 is opened at the same time observing the level in the said container which is being filled. When this latter is filled, the cock 37 is closed, and the amount delivered is read upon the glass tube 52. Should the quantity required be greater than the total capacity of the receptacle $2^2$, stoppage is effected by the cocks 53, 54, after the delivery of a determined quantity, for instance 50 litres, then the operation of filling the receptacle $2^2$ is carried out, then the operation of delivery, observing the amount delivered as in the former case, 17 for instance. The total amount of liquid supplied is therefore $50+17=67$ litres. In case the user should fail to carry out the operation of stoppage by the cocks 53, 54 after the delivery of 50 litres, the float valve 61 will close the piping 13 and will thus prevent all improper discharge of inert gas.

*Position of rest.*—When the daily period is finished, the apparatus is usually in the preparatory position, that is, the upper receptacle is now filled and the lower receptacle empty, and the compressor is stopped. The user places the cocks 53, 54 in the position shown in Fig. 7 thereby connecting pipes 14, $14^a$ and 12 through bleeds 55 and 56 and opens the valve 51. In this position, a free communication will be established between the atmospheres of the receptacles $2^1$, $2^2$, and between the liquids in the receptacles 1, $2^1$, $2^2$. The liquid will now flow by gravity i. e., siphon through $3^a$, 51 and 3 into the storage tank, and the pressure in the whole apparatus will be established at or very near atmospheric pressure, the difference between this pressure and atmospheric pressure being due to variations of external temperature after starting the apparatus. The pointer of the pressure gauge should become stationary in proximity to zero. Should the indication of the gauge be considerably different from zero, this will lead to the conclusion that the apparatus is subject to leakage whereby outer air is caused to enter the installation and means should be taken to obviate this leakage.

In case it is desired to assume the position of rest while the reservoir $2^1$ is filled and the reservoir $2^2$ is empty, the operations are exactly the same.

The filling of the storage tank 1 from the supply casks may be effected for instance by the use of the double piping 8 and 49 as is the case of the installation shown in Figs. 1 and 2.

I claim—

1. A low pressure pneumatic apparatus for the dispensing of liquids comprising: two combined receptacles; a closed circuit of a constant mass of gas; a compressor arranged in this closed circuit; means for starting said compressor and therefore moving the gas; a set of pipes for the liquid and the gas.

2. A low pressure pneumatic apparatus for the dispensing of liquids comprising, in combination with a storage tank: two combined receptacles, two gas tanks, a compressor placed between the said two tanks; a closed and reduced circuit of gas between the receptacles, the compressor and the two gas tanks; a piping for this closed gas circuit; a piping for the liquid; and means for starting the compressor and therefore moving the gas.

3. A low pressure pneumatic apparatus for the dispensing of liqiuds comprising: a storage tank; two receptacles; a closed and reduced circuit of gas for manipulating and protecting the liquid, this circuit not including the storage tank; means for filling by suction one of the said receptacles with the liquid of the storage tank; means for forcing out of the second receptacle by means of the gas the liquid of the said second receptacle; a set of pipes for the gas and the liquid.

4. A low pressure pneumatic apparatus for the dispensing of liquids comprising: a storage tank; twin piping for filling this tank with a liquid from an external supply; means for maintaining at all times in the storage tank the atmospheric pressure; two receptacles independent of the storage tank; a compressor; a closed circuit of gas between the receptacles and the compressor, and a set of pipes for the liquid and the gas.

5. A low pressure pneumatic apparatus for the dispensing of liquids, comprising: a storage tank; an auxiliary receptacle; means for effecting direct suction of the liquid from the storage tank into the auxiliary receptacle; a main receptacle; means for forcing the liquid of the auxiliary receptacle into the main receptacle; and means for delivering out the liquid of the main receptacle.

6. A low pressure pneumatic apparatus for the dispensing of liquids, comprising: a storage tank; an auxiliary receptacle and a main receptacle; a compressor, a closed circuit of gas between the two receptacles and the compressor; means for measuring the liquid in the main receptacle; a set of pipes for the liquid and the gas.

7. A low pressure pneumatic apparatus for the dispensing of liquids, comprising: a storage tank; a dome on this storage tank; a receptacle disposed within said dome; a check valve between the said receptacle and the storage tank; another receptacle arranged above the first receptacle; measuring means upon this upper receptacle; a compressor; a closed circuit of gas between this compressor and the two receptacles; and a set of pipes for the liquid and the gas.

8. A low pressure pneumatic apparatus for the dispensing of liquids, comprising: a storage tank; two receptacles; a compressor; a closed circuit of gas between this compressor and the two receptacles; a set of pipes for the liquid and the gas; and two combined multiple-way cocks placed on the said pipes for the simultaneous control of the gas and liquid in the whole installation.

9. A low pressure pneumatic apparatus for the dispensing of liquids, comprising: a storage tank; two receptacles; a compressor; a closed circuit of gas between this compressor and the two receptacles; a set of pipes for the liquid and the gas; two combined cocks for simultaneous control of the gas and the liquids; and means for placing all the elements of the installation under general atmospheric pressure during the period of rest.

10. A low pressure pneumatic apparatus for the dispensing of liquids, comprising a liquid storage tank, a receptacle above the liquid level in said tank, a second discharge receptacle above the level of the first receptacle, a valve-controlled syphon between said tank and lower receptacle, a pipe for liquid connecting the receptacles and having a discharge valve therein, a pipe for gas connecting the two receptacles, a pair of gas reservoirs, a compressor connected between them and a cock controlling the gas pipe and communication to the reservoirs, and means to supply an inert gas to the system.

In testimony that I claim the foregoing as my invention, I have signed my name.

PIERRE ANDRÉ PAUL VICTOR MAUCLÈRE.